United States Patent
Eppelein

(10) Patent No.: US 7,048,286 B2
(45) Date of Patent: May 23, 2006

(54) REAR AXLE OF A PASSENGER VEHICLE WITH FIVE INDIVIDUAL LINKS

(75) Inventor: Ralph Eppelein, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 52 days.

(21) Appl. No.: 10/753,351

(22) Filed: Jan. 9, 2004

(65) Prior Publication Data

US 2004/0140641 A1 Jul. 22, 2004

Related U.S. Application Data

(63) Continuation of application No. PCT/EP02/06076, filed on Jun. 4, 2002.

(30) Foreign Application Priority Data

Jul. 10, 2001 (DE) ................. 101 33 424

(51) Int. Cl.
*B60G 21/05* (2006.01)

(52) U.S. Cl. ............................. 280/124.106
(58) Field of Classification Search ......... 280/124.106, 280/124.107, 124.103, 124.104
See application file for complete search history.

(56) References Cited

U.S. PATENT DOCUMENTS

| 4,444,415 A | 4/1984 | von der Ohe |
| 4,705,292 A * | 11/1987 | Hespelt et al. ........ 280/124.139 |
| 4,878,688 A | 11/1989 | Kubo |
| 4,930,804 A | 6/1990 | Tattermusch et al. |
| 5,026,091 A * | 6/1991 | Lee ....................... 280/124.106 |
| 5,116,076 A | 5/1992 | Moll |
| 5,507,510 A | 4/1996 | Kami et al. |
| 2005/0046136 A1 * | 3/2005 | Sutton ................. 280/124.135 |

FOREIGN PATENT DOCUMENTS

| DE | 30 48 864 | 7/1982 |
| DE | 41 08 164 | 9/1992 |
| DE | 44 08 571 | 9/1994 |
| EP | 1 123 821 | 8/2001 |

* cited by examiner

*Primary Examiner*—Faye M. Fleming
(74) *Attorney, Agent, or Firm*—Crowell & Moring LLP

(57) ABSTRACT

A rear axle of a passenger vehicle whose wheel mount is guided by five individual suspension links, at least two of which are coupled above the midpoint of the wheel and at least two are coupled essentially beneath the midpoint of the wheel, and the so-called steering rod as the fifth link is coupled behind the midpoint of the wheel (as seen in the direction of travel). The two upper transverse links are situated in front of a spring element (as seen in the direction of travel) and/or a shock absorber element, which is located between the vehicle body and one of the lower suspension links. The steering rod is pitched at an angle of sweep with respect to the transverse direction of the vehicle. The coupling points on the wheel mount side of the two upper suspension links and/or the lower suspension links are offset in height with respect to one another and neither the two upper suspension links nor the lower transverse link and the (lower) frame side bar describes a common plane. All the arms are preferably ultimately linked directly or indirectly to a rear axle mount which forms a supporting frame.

7 Claims, 4 Drawing Sheets

REAR AXLE OF A PASSENGER VEHICLE WITH FIVE INDIVIDUAL LINKS

BACKGROUND OF THE INVENTION

The present invention relates to a rear axle of a motor vehicle, in particular a passenger vehicle whose wheel mount is guided by five individual suspension links, two of which are linked above the midpoint of the wheel and at least two of which are linked essentially beneath the midpoint of the wheel, and where the steering rod is linked above or below same, as seen from behind the midpoint of the wheel.

DE 44 08 571 A1 provides a technical background. Five-link suspension axles are, generally speaking, characterized in principle by optimum freedom of design, in particular with regard to the kinematic relationships, with special emphasis on the elastokinematics. Problems arise, however, due to the design space management, i.e., how the available design space is utilized in the best possible way, taking into account all possible relative movements between the individual parts without having to accept unwanted vehicle handling responses as a result of these suspension link movements.

SUMMARY OF THE INVENTION

An object of the present invention is to provide a rear axle characterized by a particularly advantageous utilization of the available design space.

This object has been achieved by locating the two upper suspension links in front of a spring element (as seen in the direction of travel) and/or a shock absorber element which is located between the vehicle body and one of the lower suspension links.

With both of the two upper suspension links situated in front of a spring element (as seen in the direction of travel of the vehicle) and/or a shock absorber element on which the vehicle body is supported on the rear axle, these two suspension links can be configured to be relatively short. Thus the pivoting movements executed by these upper suspension links in spring deflection and rebounding of the vehicle body with respect to the axle are relatively minor. This greatly reduces the possibility of a collision of one of these suspension links with a frame side bar, which is usually present in this area in conventional configurations. Thus an essentially linear or at least slightly offset suspension link design is now achievable, resulting in a greater rigidity than is the case with a highly offset suspension link.

A more rigid suspension link can then be mounted to advantage by means of simple, reliable rubber bearings and does not require complex bearings such as a ball-head bearing. Despite a frame side bar that is optimally configured (with regard to rigidity requirements), the upper transverse links configured according to the present invention can thus also configured absolutely in a straight line, thus also yielding kinematic advantages.

Due to the arrangement of the steering rod, which is coupled to the wheel mount (both above and beneath) behind the midpoint of the wheel in the direction of travel of the vehicle and constitutes one of the three lower suspension links, the steering rod can be configured to be relatively long, which advantageously results in a lower tolerance sensitivity. Therefore, the cardanic forces and torsion to be absorbed in the corresponding joint (in particular between the steering rod and the wheel mount) are lower, which here again allows the use of simple rubber bearings (instead of ball-and-socket joints). Furthermore, a rear wheel steering can be implemented in a relatively simple manner with such a steering rod configuration.

If the steering rod runs in a plane parallel to the road surface so that it is pitched with respect to the transverse direction of the vehicle, i.e., if there is an angle of sweep of the steering rod (in a view of the rear axle from above), then a geometric position of the effective expansion axle is possible, producing an elastokinematic change in toe-in which has a neutral or stabilizing effect on the vehicle as a whole. This is true in the case of driving when forces act on the midpoint of the wheel between the wheel and the road surface as well as in the braking case when these forces act in the wheel contact area. This is further true, in particular, when the absolute value of either the so-called tractive force lever arm or the so-called braking force lever arm is small and the absolute values of these two lever arms are different. In other words, the expansion axle of the wheel suspension either runs almost through the midpoint of the wheel or almost through the midpoint of the wheel contact area, i.e., it is very close to one of these midpoints or it even passes through one of these midpoints. The so-called angle of sweep of the steering rod may then preferably be on the order of 3° to 25°.

With the coupling points of the two upper suspension links and/or the lower suspension links on the wheel mount side offset in height in relation to one another, a gain in design space results because there is no collision between the screw elements or the like between adjacent suspension links and the wheel mount. In particular, the two upper transverse links as well as the lower transverse link and the (lower) frame side bar can be coupled advantageously especially close to one another on the wheel mount, which is important, in particular for the position of the effective expansion axle. Favorable kinematic relationships can be achieved if neither the two upper suspension links nor the lower transverse link and the (lower) frame side bar describes a common plane.

The steering rod configuration is advantageous in terms of manufacture and assembly. In most cases suspension links are linked at the end in a so-called double-shear linkage, i.e., a mounting bar, etc., which is provided on the wheel mount or on the vehicle body and/or a so-called carriage or axle mount, is in contact with the two opposite sides of the suspension link eye, etc. In particular with a relatively long and backswept steering rod and also because of the lack of tolerance sensitivity mentioned above, a single-shear linkage is achievable on the carriage or axle mount, advantageously permitting a short design length of this carriage or axle mount. This single-shear linkage or screw connection on the carriage is preferably designed so that a structure-reinforcing connection (e.g., in the form of a welded spacer bushing) is provided between adjacent walls of a mount part of the carriage through which a bolt or screw element of the single-shear linkage is passed. The total flexural rigidity of the cross section of the mount part or carriage available at this point for a single-shear linkage connection can thus be advantageously utilized.

As will be apparent to one skilled in the art, all the suspension links of a rear axle according to the present invention may ultimately be linked directly or indirectly to a rear axle mount forming a supporting frame, thus simplifying in particular assembly of the entire axle unit.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein.

DETAILED DESCRIPTION OF THE DRAWINGS

Figure 1:
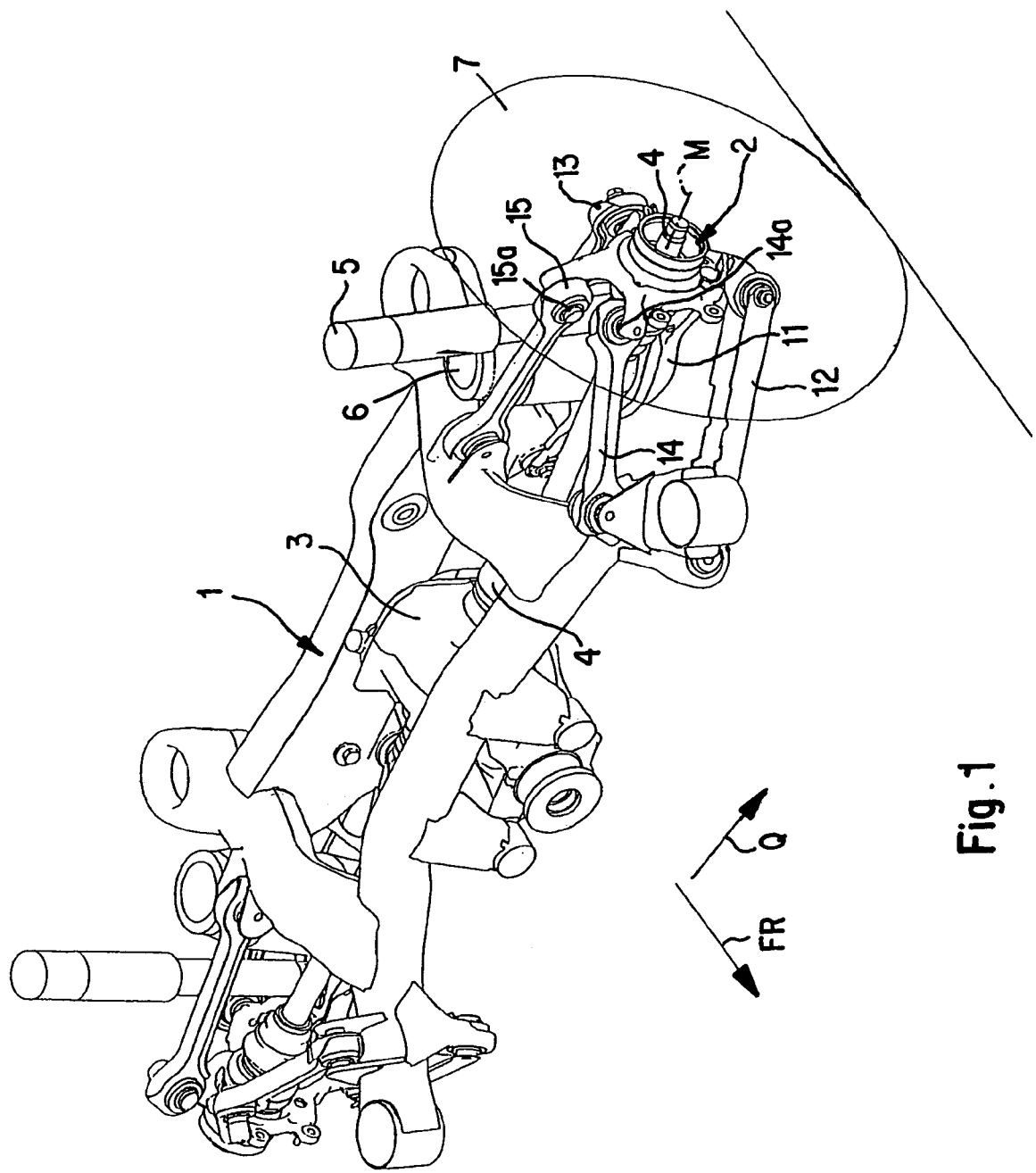
FIG. 1 is a perspective view of one embodiment of a rear axle according to the present invention.
Figure 4:
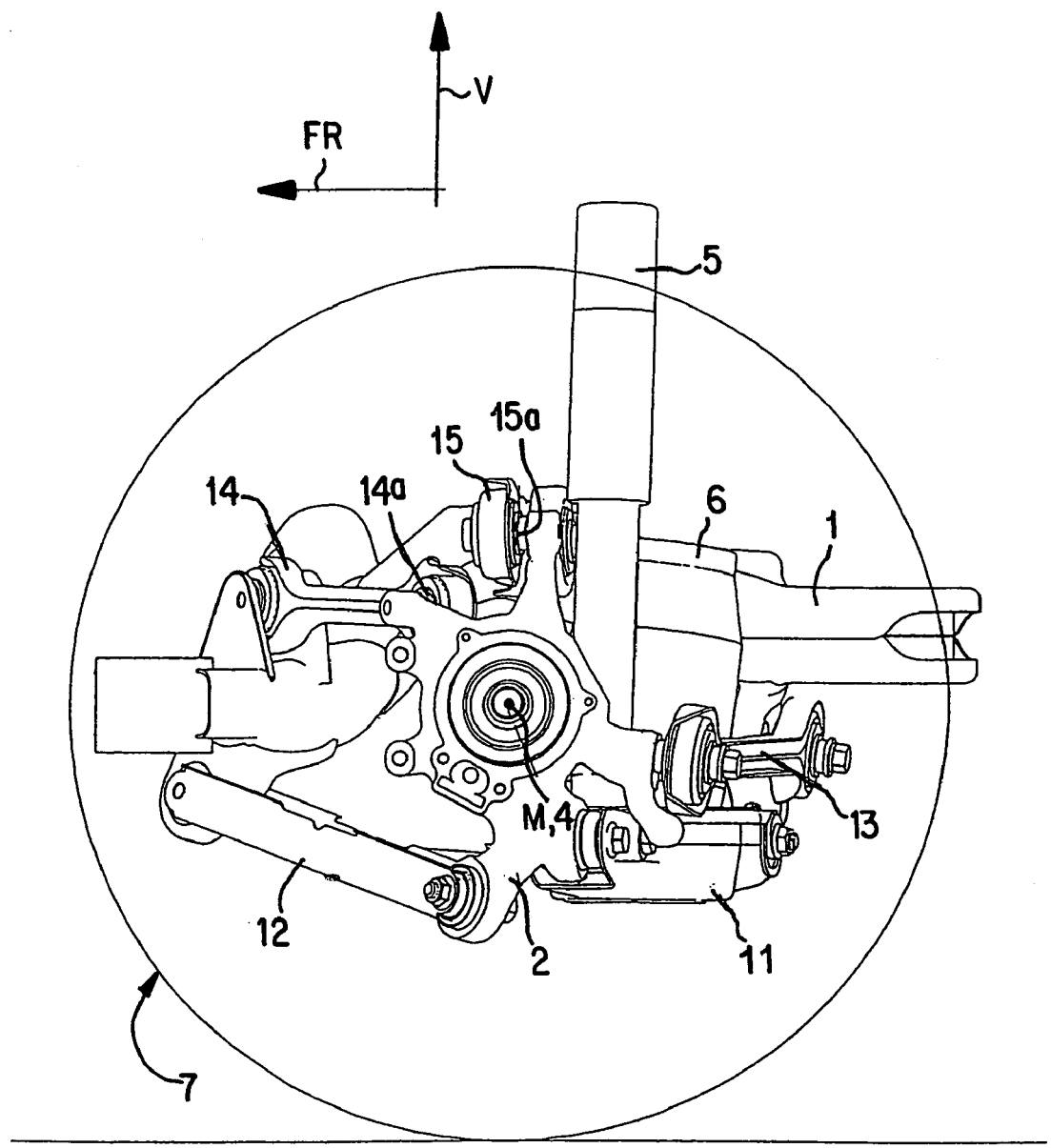
FIG. 4 is a side view of the rear axle of FIG. 1.

A rear axle mount or carriage designated generally by numeral 1 is linked essentially via four fastening points to the vehicle body (not shown). Two wheel mounts 2, which are provided on both sides of the rear axle mount 1 (only the wheel mount 2 on the left side in the direction of travel designated by arrow FR is shown in all the drawing figures), are each suspended on the rear axle mount 1 by way of five suspension links 11, 12, 13, 14, 15. Furthermore, an integrated rear differential 3 with a central suspension is provided in the rear axle mount 1, with an output shaft 4 leading from this differential 3 to the hubs on the wheel mounts 2, which hubs are of generally known construction and thus not shown in detail here, for the rear wheels 7 (depicted schematically in FIGS. 1 and 4) on the vehicle.

A spring element 6 can be seen on both sides plus an adjoining shock absorber 5, by way of which the vehicle body (not shown) is supported essentially in the vertical direction on the rear axle, or more specifically on one of the lower transverse links, namely the so-called spring-shock-absorber-link 11. The transverse direction of the vehicle is indicated by the arrow Q, while the longitudinal direction of the vehicle is equal to the direction of travel of the vehicle which, as previously noted, is represented by the arrow FR.

In addition to the (lower) spring-shock-absorber-link 11, another suspension link 12 is coupled beneath the midpoint M of the wheel (i.e., the midpoint line M of the wheel running horizontally) to the wheel mount 2. This link 12 is referred to as a frame side bar which extends also in the transverse direction Q of the vehicle. Finally, a third suspension link 13 here is also coupled to the wheel mount 2 beneath the midpoint M of the wheel, namely the so-called steering rod 13 (as an alternative, however, this steering rod 13 may also be at the level of or beneath the midpoint M of the wheel).

In addition to the above-mentioned suspension links 11, 12, 13, which are coupled to the wheel mount 2, there are also two suspension links 14, 15 coupled to the wheel mount 2 above the midpoint M of the wheel. These two suspension links run in front of the spring element 6 and the shock absorber 5, as seen in the direction of travel FR, with the advantages indicated above. In the vertical direction V (see FIG. 3), the coupling points 14a, 15a of these upper transverse links 14, 15 are situated one above the other, and the same is also true of their coupling points on the rear axle mount 1 because the two upper suspension links 14, 15 run essentially parallel to one another in the vertical plane (corresponding to the plane of the drawing in FIG. 3). However, because they are not parallel to one another in the horizontal plane (see FIG. 2), these two upper arms 14, 15 do not describe a common plane.

Figure 2:
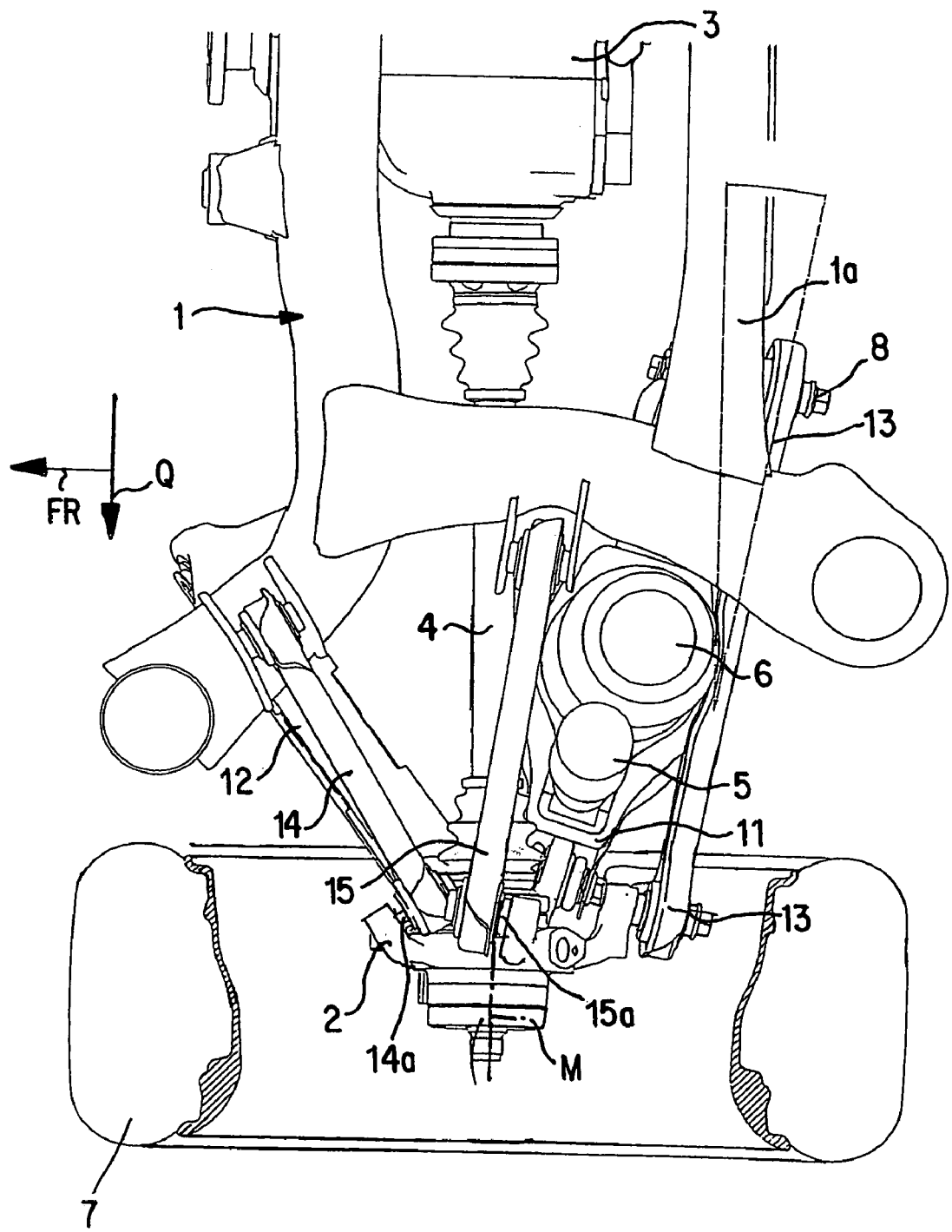
FIG. 2 is a top view of the left half of the rear axle of FIG. 1.
Figure 3:
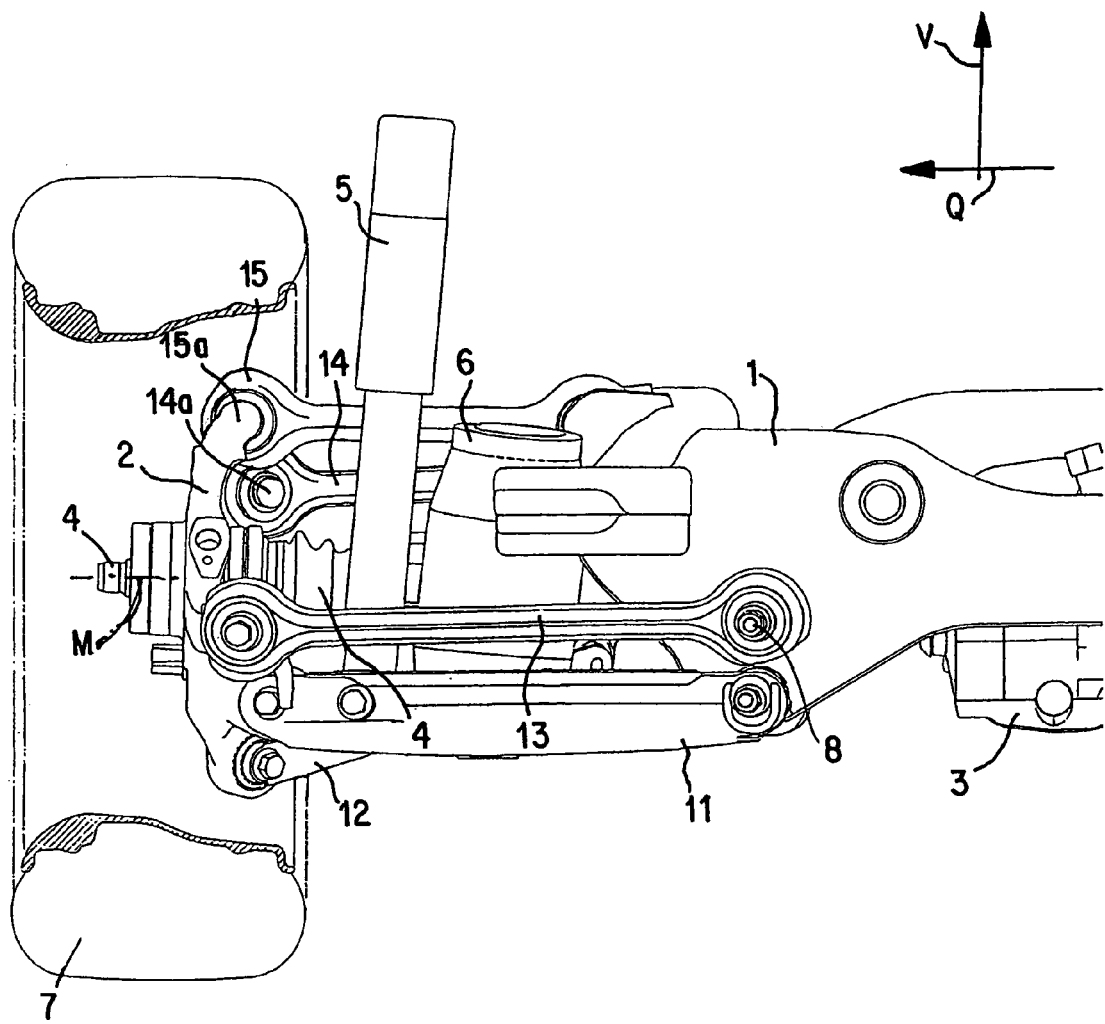
FIG. 3 is a rear view of the left half of the rear axle of FIG. 1.

The same thing is also true of the two lower suspension links 11, 12, namely the spring-shock-absorber-arm 11 and the frame side bar 12. The steering rod 13, which is also arranged as illustrated to achieve the advantages described above (in particular at an angle of sweep v on the order of 10°), is situated as described above in detail. The steering rod 13 has a single-shear linkage to the wheel mount 2 as well as the rear axle mount 1, namely on a crossbar 1a thereof, as best shown in FIGS. 2 and 3. A bolt 8 passes through a rubber bearing which is provided in the steering rod eye and through the rear wall and front wall of the crossbar 1a configured as a hollow profile or a U-shaped profile, for example. In this area, a spacer bushing (not shown) can be welded between the front wall and the rear wall of the crossbar 1a, with the bolt 8 running along the axle of the spacer bushing, advantageously reinforcing this single-shear linkage.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. Rear axle of a vehicle, comprising a wheel mount, five individual suspension links arranged to guide the wheel mount, at least two of the suspension links being upper suspension links coupled above the midpoint of a vehicle wheel and at least two of the suspension links being coupled substantially beneath a midpoint of the vehicle wheel, and one of the suspension links constituting a steering rod coupled above or below the midpoint of the vehicle wheel and behind the vehicle, as seen in a travel direction, wherein the two upper suspension links are situated forwardly, as seen in the driving direction, of at least one of a spring element (6) and a shock absorber element situated between the vehicle body and one of the lower suspension links.

2. Rear axle as claimed in claim 1, wherein the steering rod is pitched at a sweep angle on the order of magnitude of 3° to 25° with respect to the transverse direction of the vehicle.

3. Rear axle as claimed in claim 1, wherein wheel mount-side coupling points of at least one of the two upper suspension links and the lower suspension links are offset in height.

4. Rear axle as claimed in claim 1, wherein the at least two upper suspension links and the lower at least two links comprising a transverse link and (lower) a frame side bar are not in a common plane.

5. Rear axle as claimed in claim 1, wherein the steering rod is coupled in a single-shear linkage at least one end thereof.

6. Rear axle as claimed in claim 1, wherein the suspension links are linked directly or indirectly to a rear axle mount which constituted a supporting frame.

7. Rear axle as claimed in claim 3, wherein the steering rod is pitched at a sweep angle on the order of magnitude of 3° to 25° with respect to a transverse direction of the vehicle.

* * * * *